US010703964B2

(12) United States Patent
Goyal et al.

(10) Patent No.: US 10,703,964 B2
(45) Date of Patent: Jul. 7, 2020

(54) PROPPANT COATING HAVING PREFORMED ISOCYANURATE

(71) Applicant: Dow Global Technologies LLC, Midland, MI (US)

(72) Inventors: Sachit Goyal, Houston, TX (US); Kaoru Aou, Lake Jackson, TX (US); Juan Carlos Medina, Lake Jackson, TX (US); Arjun Raghuraman, Pearland, TX (US); Armin Hassanzadeh, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/561,673

(22) PCT Filed: Mar. 22, 2016

(86) PCT No.: PCT/US2016/023603
§ 371 (c)(1),
(2) Date: Sep. 26, 2017

(87) PCT Pub. No.: WO2016/160425
PCT Pub. Date: Oct. 6, 2016

(65) Prior Publication Data
US 2018/0072941 A1 Mar. 15, 2018

Related U.S. Application Data
(60) Provisional application No. 62/140,022, filed on Mar. 30, 2015.

(51) Int. Cl.
*C09K 8/80* (2006.01)
*E21B 43/267* (2006.01)

(52) U.S. Cl.
CPC .......... *C09K 8/805* (2013.01); *E21B 43/267* (2013.01)

(58) Field of Classification Search
None
See application file for complete search history.

(56) References Cited

U.S. PATENT DOCUMENTS

| 2013/0065800 | A1  | 3/2013  | McDaniel et al. |
| 2014/0162911 | A1* | 6/2014  | Monastiriotis ......... C09K 8/805 507/221 |
| 2014/0274819 | A1  | 9/2014  | McCrary et al. |
| 2015/0361331 | A1* | 12/2015 | Tanguay ................. C09K 8/62 166/280.2 |

FOREIGN PATENT DOCUMENTS

WO   2014120599 A1   8/2014

OTHER PUBLICATIONS

PCT/US2016/023603, International Search Report and Written Opinion dated Jun. 14, 2016.
PCT/US2016/023603, International Preliminary Report on Patentability dated Oct. 12, 2017.

* cited by examiner

Primary Examiner — Jeffrey D Washville

(57) ABSTRACT

A coated proppant includes a solid core proppant particle, a first resin coating, and a second coating on the first resin coating. The second coating includes the reaction product of one or more curatives and one or more preformed aliphatic or cycloaliphatic based isocyanurate tri-isocyanates, derived from aliphatic diisocyanates, cycloaliphatic diisocyanates, or a combination of aliphatic and cycloaliphatic diisocyanates.

13 Claims, 4 Drawing Sheets

PROPPANT COATING HAVING PREFORMED ISOCYANURATE

FIELD

Embodiments relate to coatings for proppants that include a preformed aliphatic or cycloaliphatic based isocyanurate tri-isocyanate, proppants that have the coatings thereon, methods of making the coatings, and methods of coating the proppants with the coatings.

Introduction

Generally, well fracturing is a process of injecting a fracturing fluid at high pressure into subterranean rocks, boreholes, etc., so as to force open existing fissures and extract oil or gas therefrom. Proppants are solid material in particulate form for use in well fracturing. Proppants should be strong enough to keep fractures propped open in deep hydrocarbon formations, e.g., during or following an (induced) hydraulic fracturing treatment. Thus, the proppants act as a "propping agent" during well fracturing. The proppants may be introduced into the subterranean rocks, boreholes, etc., within the fracturing fluid. Both a high level of coating hardness and crush resistance are sought for proppants for deeper strata, due to higher pressures and temperatures in condition of use (e.g., including process conditions and environmental conditions).

Summary

Embodiments may be realized by providing a coated proppant, which includes a solid core proppant particle, a first resin coating, and a second coating on the first resin coating. The second coating includes the reaction product of one or more curatives and one or more preformed aliphatic or cycloaliphatic based isocyanurate tri-isocyanates, derived from aliphatic diisocyanates, cycloaliphatic diisocyanates, or a combination of aliphatic and cycloaliphatic diisocyanates. Embodiments may also be realized by providing a method of making such a coated proppant.

BRIEF DESCRIPTION OF THE DRAWINGS

Features of the embodiments will become more apparent to those of ordinary skill in the art by describing in detail exemplary embodiments thereof with reference to the attached, in which.

DETAILED DESCRIPTION

Figure 1:
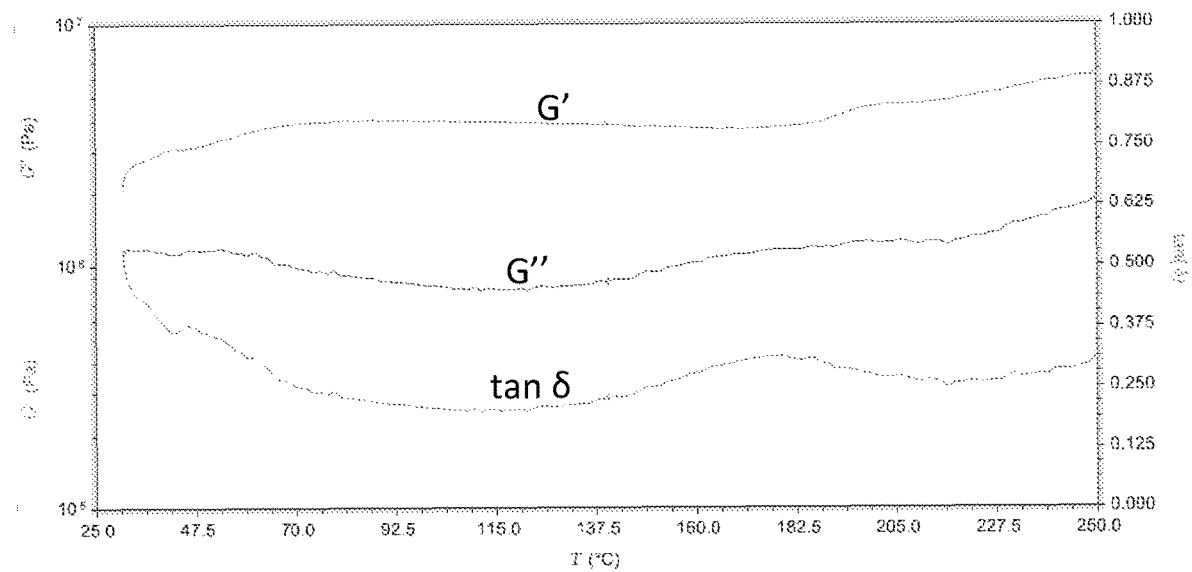
FIG. 1 illustrates a dynamic mechanical thermal analysis (DMTA) data graph for the coated proppants of Working Example 1.

Polyurethanes based coatings have been used as resin coats, e.g., based on polyurethane chemistry, have been proposed for use in forming coatings on proppants such as sand and ceramics. As used herein, the term polyurethane encompasses the reaction product of a polyol (e.g., polyether polyol and/or polyester polyol) with an isocyanate over range of all possible isocyanate indices (e.g., from 50 to 1000). Polyurethanes offer various advantages in resin-coated proppant applications, e.g., such as ease of processing, base stability, and/or rapid cure rates that enable short cycle times for forming the coating. Further, polyurethane components may be less hazardous relative to phenol-formaldehyde resins.

A polyurethane polymer in the form of a coating may be formulated to maintain its properties even when exposed to high temperature, e.g., to temperatures of at least 70° C. However, an opportunity exists to further improve the performance of coatings for proppants, especially in down-well applications at higher temperatures (such as greater than 120° C.) and elevated pressures (such as in excess of 6000 psig), by designing coatings that retain a high storage modulus at temperatures of up to at least 175° C., which may be typically encountered during hydraulic fracturing of deep strata. The coating may have a glass transition temperature greater than at least 140° C., e.g., may not realize a glass transition temperature at temperatures below 160° C., below 200° C., below 220° C., below 240° C., and/or below 250° C. The overall coating may include two or more separately formed layers. For example, the coating may consist essentially of two separately formed layers that are directly on each other.

In embodiments, the coating includes one or more aliphatic or cycloaliphatic based isocyanurate tri-isocyanates, derived from aliphatic diisocyanates, cycloaliphatic diisocyanates, or a combination of aliphatic and cycloaliphatic diisocyanates (also referred to herein as a preformed isocyanurate tri-isocyanate). The preformed isocyanurate tri-isocyanate may also be referred to herein as an isocyanate trimer and/or isocyanurate trimer. By preformed it is meant that the isocyanurate tri-isocyanate is prepared prior to making a coating that includes the isocyanurate triisocyanate therewithin. Accordingly, the isocyanurate tri-isocyanate is not prepared via in situ trimerization during formation of the coating. In particular, one way of preparing polyisocyanates trimers is by achieving in situ trimerization of isocyanate groups, in the presence of suitable trimerization catalyst, during a process of forming polyurethane polymers. For example, the in situ trimerization may proceed as shown below with respect to Schematic (a), in which a diisocyanate is reacted with a diol (by way of example only) in the presence of both a urethane catalyst and a trimerization (i.e. promotes formation of isocyanurate moieties from isocyanate functional groups) catalyst. The resultant polymer includes both polyurethane polymers and polyisocyanurate polymers, as shown in Schematic (a), below.

Schematics (a) and (b)

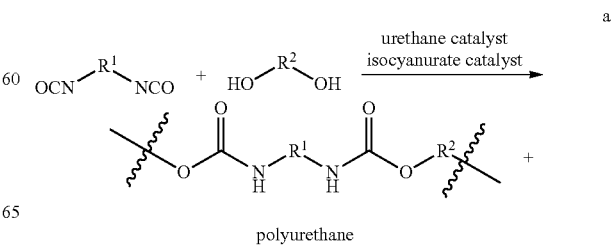

polyurethane

-continued

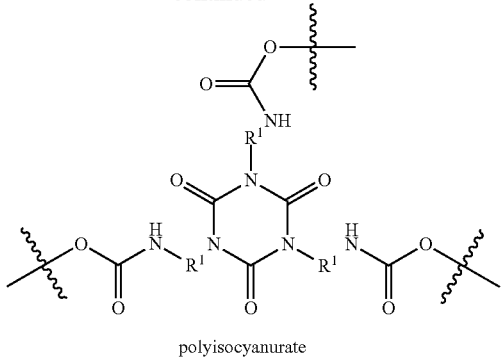

polyisocyanurate

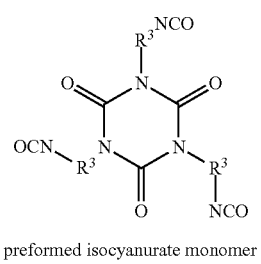

preformed isocyanurate monomer

In contrast, referring to Schematic (b) above, in embodiments the preformed isocyanurate triisocyanate is provided as a separate preformed isocyanurate-isocyanate component, i.e., is not mainly formed in situ during the process of forming polyurethane polymers. The preformed isocyanurate tri-isocyanate may be provided in a mixture for forming the coating in the form of a monomer, and not in the form of being derivable from a polyisocyanate monomer while forming the coating. For example, the isocyanate trimer may not be formed in the presence of any polyols and/or may be formed in the presence of a sufficiently low amount of polyols such that a polyurethane forming reaction is mainly avoided (as would be understand by a person of ordinary skill in the art). With respect to the preformed isocyanurate tri-isocyanate, it is believed that the existence of isocyanurate rings leads to a higher crosslink density. Further, the higher crosslink density may be coupled with a high decomposition temperature of the isocyanurate rings, which may lead to enhanced temperature resistance. Accordingly, it is proposed to introduce a high level of isocyanurate rings in the coatings for proppants using the preformed isocyanurate tri-isocyanates.

The resultant coating may not realize a glass transition temperature within a working temperature range typically encountered during hydraulic fracturing of deep strata. For example, the resultant coating may not realize a glass transition temperature within the upper and lower limits of the range from 25° C. to 250° C. Accordingly, the coating may avoid a soft rubbery phase, even at high temperatures (e.g., near 200° C. and/or near 250° C.). For example, coatings that exhibit a glass transition temperature within the range of temperatures typically encountered during hydraulic fracturing of deep strata, will undergo a transition from a glassy to rubbery state and may separate from the proppant, resulting in failure.

According to embodiments, the proppants are coated with at least an undercoat layer and a top coat layer. The undercoat layer may be formed prior to forming the top coat layer, e.g., the undercoat layer may be form immediately preceding formation of the top coat layer or a previously coated proppant may be coated with the top coat layer. The proppants may be coated with additional layers, e.g., between the undercoat layer and a solid core proppant particle, between the undercoat and the top coat layer, and/or on the top coat layer opposing the solid core proppant particle. The undercoat layer may be formed separately from the top coat layer. In exemplary embodiments, the undercoat is layer is coated directly on the solid core proppant particle (e.g., which does not have a resin layer previously formed thereon) and the top coat is formed directly on the undercoat layer. For example, the top coat may be directly on the undercoat. The top coat, with the undercoat layer, may be utilized to provide enhanced properties for proppants for deeper strata.

The undercoat layer is a resin coating. For example, the undercoat layer may include a phenolic-formaldehyde resin (also known as "phenolic resin" or "resole resin"), an epoxy resin, and/or a polyurethane resin. For example, the phenolic-formaldehyde resin, epoxy resin, and/or polyurethane resin based undercoat layer may be a coating that in known in the art, e.g., known in the art for coating proppants. The undercoat layer may be formed of one or more resins. In exemplary embodiments, the undercoat layer includes at least 75 wt %, at least 85 wt %, at least 95 wt %, and/or at least 99 wt % of polyurethane resins, based on the total weight of the resins in the resultant coating.

In exemplary embodiments, the undercoat layer includes (e.g., is formed of) a polyurethane resin. For example, the undercoat layer (i.e., a first coating) may be the polyurethane based reaction product of an isocyanate component and an isocyanate-reactive component. The undercoat layer is formed in the presence of a trimerization catalyst and may incorporate both polyurethane polymers and polyisocyanurate polymers. The proppants are further coated with a top coat layer (i.e., a second coating) that is the cured product of at least the preformed isocyanurate tri-isocyanate and a curative. After forming and optionally after curing the coatings on the proppants, a second stage may be performed that includes exposure of the coated proppant to high pressure conditions (e.g., such as in excess of 6000 psig) and high temperature conditions (e.g., such as a temperature greater than 120° C.). Full curing of the coatings may be performed prior to the second stage or concurrently with the second stage, e.g., the coatings may only be partially cured prior to being exposed at the high pressure and high temperature conditions.

As illustrated in Schematic (c), below, the undercoat is prepared using polyurethane chemistry, which includes the reaction of an isocyanate moiety with an isocyanate-reactive hydrogen atom containing compound (such as a polyol). The top coat is prepared using the preformed isocyanurate tri-isocyanate (e.g., as a monomer) and a curative such as a polyamine and/or polyol. Optionally, a catalyst may be used. Optionally, the catalyst may be provided with a polyol as a carrier. The resultant cured polymer may be a urethane isocyanurate and/or urea isocyanurate depending on the curative composition used.

Schematic (c)

undercoat chemistry

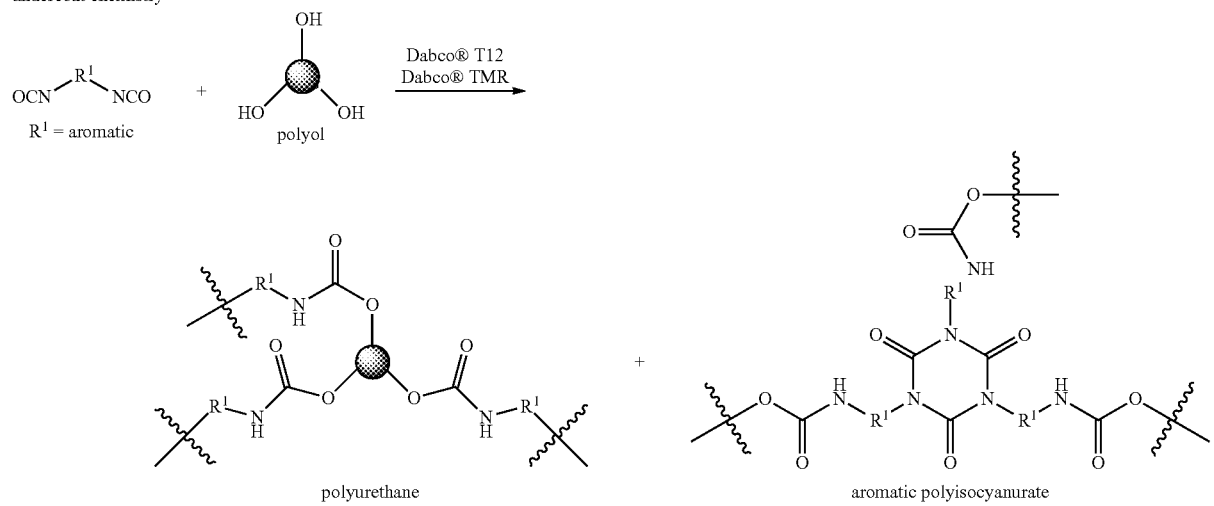

topcoat chemistry

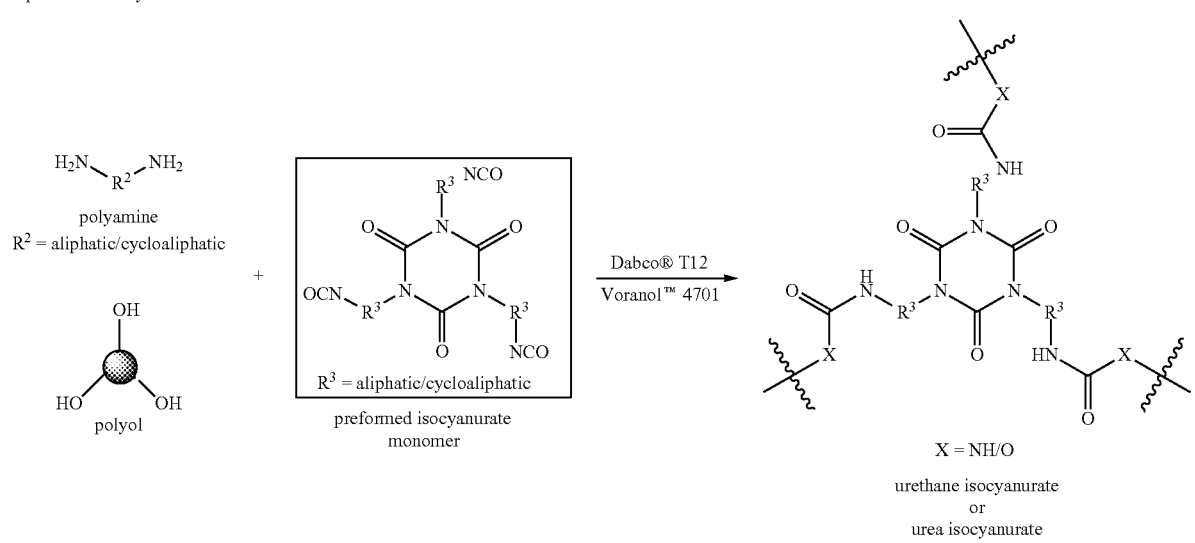

An amount of the undercoat may be from 0.5 wt % to 2.5 wt % (e.g., 1.0 wt % to 2.5 wt %, 1.5 wt % to 2.5 wt %, 1.7 wt % to 2.5 wt %, etc.), based on the total weight of the coated proppant. An amount of the top coat may be from 0.5 wt % to 2.5 wt % (e.g., 0.5 wt % to 2.0 wt %, 0.5 wt % to 1.5 wt %, 0.5 wt % to 1.25 wt %, etc.), based on the total weight of the coated proppant. A total amount of coatings on the proppant may be from 1.0 wt % to 5.0 wt %, based on the total weight of the coated proppant. For example, the ratio of the undercoat to the top may be from 1:1 to 3:1, such that the amount of the top coat is equal to or less than the amount of the undercoat. A thickness of the undercoat may be from 1 μm to 50 μm (e.g., greater than 5 μm and up to 8 μm). A thickness of the top coat may be from 1 μm to 30 μm (e.g., from 1 μm to 5 μm). A thickness of the top coat may be less than a thickness of the undercoat.

Top Coat

In embodiments, the top coat is a cured layer derived from a mixture that includes one or more preformed isocyanurate tri-isocyanates and one or more curatives. For example, the top layer may include one or more aliphatic isocyanate based isocyanurate tri-isocyanates, one or more cycloaliphatic isocyanate based isocyanurate tri-isocyanates, or combinations thereof. In exemplary embodiments, the top coat is derived from at least a preformed cycloaliphatic isocyanate based isocyanurate tri-isocyanate, e.g., the preformed cycloaliphatic isocyanate based isocyanurate tri-isocyanate may be present in an amount from 80 wt % to 100 wt %, based on the total amount of the isocyanurate tri-isocyanates used in forming the top coat.

Exemplary preformed isocyanurate tri-isocyanates include the isocyanurate tri-isocyanate derivative of 1,6-hexamethylene diisocyanate (HDI) and the isocyanurate tri-isocyanate derivative of isophorone diisocyanate (IPDI). For example, the isocyanurate tri-isocyanates may include an aliphatic isocyanate based isocyanurate tri-isocyanates based on HDI trimer and/or cycloaliphatic isocyanate based isocyanurate tri-isocyanates based on IPDI trimer. Many other aliphatic and cycloaliphatic diisocyanates that may be used (but not limiting with respect to the scope of the embodiments) are described in, e.g., U.S. Pat. No. 4,937,366. It is understood that in any of these isocyanurate tri-isocyanates, one can also use both aliphatic and cycloaliphatic isocyanates to form an preformed hybrid isocyanurate tri-isocyanate, and that when the term "aliphatic isocyanate based isocyanurate tri-isocyanate" is used, that such a hybrid is also included.

The one or more curatives (i.e., curative agents) may include an amine based curative such as a polyamine and/or an hydroxyl based curative such as a polyol. For example the one or more curatives may include one or more polyols, one or more polyamines, or a combination thereof. Curative known in the art for use in forming coatings may be used. The curative may be added, after first coating the proppant with the preformed aliphatic or cycloaliphatic isocyanurate tri-isocyanate. The curative may act as a curing agent for both the top coat and the undercoat. The curative may also be added, after first coating following the addition of the preformed aliphatic or cycloaliphatic isocyanurate tri-isocyanate in the top coat.

The mixture for forming the top coat may optionally include one or more catalysts. For example, urethane catalysts known in the art for forming polyurethane coatings may be used. Exemplary urethane catalyst include various amines (especially tertiary amines), tin containing catalysts (such as tin carboxylates and organotin compounds, e.g. stannous octoate and dibutyltin dilaurate), tertiary phosphines, various metal chelates, and metal salts of strong acids (such as ferric chloride, stannic chloride, stannous chloride, antimony trichloride, bismuth nitrate, and bismuth chloride).

The one or more catalysts may optionally be provided in a carrier polyol, e.g., a high number average molecular weight polyol. The carrier polyol may be present in an amount of at least 90 wt % (at least 93 wt %, at least 95 wt %, at least 97 wt %, etc.) and less than 99 wt %, based on the total weight of the one or more catalyst and the carrier polyol. The carrier polyol includes at least one polyol that has a number average molecular weight of at least 1000 g/mol (e.g., includes only one or more polyols having the average molecular weight of at least 1000 g/mol). For example, the carrier polyol may have a molecular weight from 3000 g/mol to 6000 g/mol (e.g., 4000 g/mol to 6000 g/mol, 4500 g/mol to 5500 g/mol, etc.). The carrier polyol may have on average from 1 to 8 hydroxyl groups per molecule, e.g., from 2 to 4 hydroxyl groups per molecule. For example, the carrier polyol be a diol or triol.

After forming the top coat a surfactant may be added, e.g., concurrently with the curative and/or before addition of the curative. For example, the surfactant may be used to improve flow properties with respect to the coating and/or to improve the coating structure. It is believed that the surfactant may assist in enabling the formation of distinct layers on the proppants. Optionally, the isocyanate-to-hydroxyl reaction may be controlled (e.g., end time may be controlled) by adding an acidic compound such as phosphoric acid and/or acid phosphate at a desired conversion ratio.

Undercoat

In embodiments, the undercoat layer is a resin based coating that includes, e.g., one or more phenolic-formaldehyde resins, one or more epoxy resins, and/or one or more polyurethane resins. For example, in exemplary embodiments, the undercoat is a polyurethane based layer. The undercoat may be the reaction product of a mixture that includes an isocyanate component and an isocyanate-reactive component. The isocyanate-reactive component includes at least a polyol that has a number average molecular weight from 150 g/mol to 6000 g/mol (and optionally additional polyols) and includes a catalyst component having at least an isocyanate trimerization catalyst (and optionally additional catalysts). The mixture for forming the undercoat has an isocyanate index that is at least 100. The undercoat may be highly resistant to the conditions encountered in immersion in fracturing fluids at elevated temperatures. For example, the undercoat layer used may be similar to as discussed in, e.g., U.S. Patent Publication No. 2013/0065800.

The amount of the isocyanate component used relative to the isocyanate-reactive component in the reaction system for forming polyurethane based coating is expressed as the isocyanate index. For example, the isocyanate index may be from 100 to 2000 (e.g., 100 to 1000, 100 to 300, 100 to 200 and/or 125 to 175 etc.). The isocyanate index is the equivalents of isocyanate groups (i.e., NCO moieties) present, divided by the total equivalents of isocyanate-reactive hydrogen containing groups (i.e., OH moieties) present, multiplied by 100. Considered in another way, the isocyanate index is the ratio of the isocyanate groups over the isocyanate reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

The isocyanate component may include one or more polyisocyanates, one or more isocyanate-terminated prepolymer derived from the polyisocyanates, and/or one or more quasi-prepolymers derived from the polyisocyanates. Isocyanate-terminated prepolymers and quasi-prepolymers (mixtures of prepolymers with unreacted polyisocyanate compounds), may be prepared by reacting a stoichiometric excess of a polyisocyanate with at least one polyol. Exemplary polyisocyanates include aromatic, aliphatic, and cycloaliphatic polyisocyanates. According to exemplary embodiments, the isocyanate component may only include aromatic polyisocyanates, prepolymers derived therefrom, and/or quasi-prepolymers derived therefrom, and the isocyanate component may exclude any aliphatic isocyanates and any cycloaliphatic polyisocyanates. The polyisocyanates may have an average isocyanate functionality from 1.9 to 4 (e.g., 2.0 to 3.5, 2.8 to 3.2, etc.). The polyisocyanates may have an average isocyanate equivalent weight from 80 to 160 (e.g., 120 to 150, 125 to 145, etc.).

Exemplary isocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for polyurethane based coatings. Exemplary commercially available isocyanate products include PAPI™ products and VORANATE™ products, available from The Dow Chemical Company.

The isocyanate-reactive component includes one or more polyols that have a number average molecular weight of at number average molecular weight from 150 g/mol to 6000 g/mol (e.g., 150 g/mol to 3000 g/mol, 150 g/mol to 2000 g/mol, 150 g/mol to 1500 g/mol, 150 g/mol to 1000 g/mol, 150 g/mol to 500 g/mol, 150 g/mol to 400 g/mol, 150 g/mol to 300 g/mol, etc.). The one or more polyols have on average from 1 to 8 hydroxyl groups per molecule, e.g., from 2 to 4 hydroxyl groups per molecule. For example, the one or more polyols may independently be a diol or triol. For example, the isocyanate-reactive component may include at least 80 wt % and/or at least 90 wt % of one or more low molecular weight polyols (e.g., a number average molecular weight of from 150 g/mol to 1000 g/mol), based on a total weight of the isocyanate-reactive component.

The one or more polyols may be alkoxylates derived from the reaction of propylene oxide, ethylene oxide, and/or butylene oxide with an initiator. Initiators known in the art for use in preparing polyols for forming polyurethane polymers may be used. For example, the one or more polyols may be an alkoxylate of any of the following molecules, e.g., ethylene glycol, diethylene glycol, triethylene glycol, 1,2-propanediol, dipropylene glycol, tripropylene glycol, 1,4-butanediol, 1,6-hexanediol, and glycerine. According to exemplary embodiments, the one or more polyols may be derived from propylene oxide and ethylene oxide, of which less than 20 wt % (e.g., and greater than 5 wt %) of polyol is derived from ethylene oxide, based on a total weight of the alkoxylate. According to another exemplary embodiment, the polyol contains terminal ethylene oxide blocks.

In exemplary embodiments, the isocyanate-reactive component may include alkoxylates of ammonia or primary or secondary amine compounds, e.g., as aniline, toluene diamine, ethylene diamine, diethylene triamine, piperazine, and/or aminoethylpiperazine. For example, the isocyanate-reactive component may include polyamines that are known in the art for use in forming polyurethane-polyurea polymers. The isocyanate-reactive component may include one or more polyester polyols having a hydroxyl equivalent weight of at least 500, at least 800, and/or at least 1,000. For example, polyester polyols known in the art for forming polyurethane polymers may be used. The isocyanate-reactive component may include polyols with fillers (filled polyols), e.g., where the hydroxyl equivalent weight is at least 500, at least 800, and/or at least 1,000. The filled polyols may contain one or more copolymer polyols with polymer particles as a filler dispersed within the copolymer polyols. Exemplary filled polyols include styrene/acrylonitrile (SAN) based filled polyols, polyharnstoff dispersion (PHD) filled polyols, and polyisocyanate polyaddition products (PIPA) based filled polyols.

The catalyst component of the isocyanate-reactive component includes one or more trimerization catalysts. Trimerization catalysts known in art for forming polyisocyanates trimers may be used. Exemplary trimerization catalysts include, e.g., amines (such as tertiary amines), alkali metal phenolates, alkali metal alkoxides, alkali metal carboxylates, and quaternary ammonium carboxylate salts. The trimerization catalyst may be present, e.g., in an amount less than 5 wt %, based on the total weight of the isocyanate-reactive component. In exemplary embodiments, the catalyst component may be pre-blended with the isocyanate-reactive component, prior to forming the first undercoat.

The catalyst component may further include one or more urethane catalysts. For example, urethane catalysts known in the art for forming polyurethane coatings may be used. Exemplary urethane catalyst include various amines, tin containing catalysts (such as tin carboxylates and organotin compounds), tertiary phosphines, various metal chelates, and metal salts of strong acids (such as ferric chloride, stannic chloride, stannous chloride, antimony trichloride, bismuth nitrate, and bismuth chloride). Exemplary tin-containing catalysts include, e.g., stannous octoate, dibutyl tin diacetate, dibutyl tin dilaurate, dibutyl tin dimercaptide, dialkyl tin dialkylmercapto acids, and dibutyl tin oxide. The urethane catalyst, when present, may be present in similar amounts as the trimerization catalyst, e.g., in an amount less than 5 wt %, based on the total weight of the isocyanate-reactive component. The amount of the trimerization catalyst may be greater than the amount of the urethane catalyst. For example, the catalyst component may include an amine based trimerization catalyst and a tin-based urethane catalyst.

Various optional ingredients may be included in the reaction mixture. For example, reinforcing agents such as fibers and flakes that have an aspect ratio (ratio of largest to smallest orthogonal dimension) of at least 5 may be used. These fibers and flakes may be, e.g., an inorganic material such as glass, mica, other ceramic fibers and flakes, carbon fibers, organic polymer fibers that are non-melting and thermally stable at the temperatures encountered in the end use application. Another optional ingredient is a low aspect ratio particulate filler, that is separate from the proppant. Such a filler may be, e.g., clay, other minerals, or an organic polymer that is non-melting and thermally stable at the temperatures encountered in stages (a) and (b) of the process. Such a particulate filler may have a particle size (as measured by sieving methods) of less than 100 µm. With respect to solvents, the undercoat may be formed using less than 20 wt % of solvents, based on the total weight of the isocyanate-reactive component.

Another optional ingredient includes a liquid epoxy resin. The liquid epoxy resin may be added in amounts up to 20 wt %, based on the total weight of the reaction mixture. Exemplary liquid epoxy resins include the glycidyl polyethers of polyhydric phenols and polyhydric alcohols. Other optional ingredients include colorants, biocides, UV stabilizing agents, preservatives, antioxidants, and surfactants. Although it is possible to include a blowing agent into the reaction mixture, in some embodiments the blowing agent is excluded from the reaction mixture.

Proppants

Exemplary proppants include silica sand proppants and ceramic based proppants (for instance, aluminum oxide, silicon dioxide, titanium dioxide, zinc oxide, zirconium dioxide, cerium dioxide, manganese dioxide, iron oxide, calcium oxide, and/or bauxite). The sand and/or ceramic proppants may be coated with a resin to, e.g. to improve the proppant mesh effective strength (e.g., by distributing the pressure load more uniformly), to trap pieces of proppant broken under the high downhole pressure (e.g., to reduce the possibility of the broken proppants compromising well productivity), and/or to bond individual particles together when under the intense pressure and temperature of the fracture to minimize proppant flowback. The proppants to be coated may have an average particle size from 50 µm to 3000 µm (e.g., 100 µm to 2000 µm).

Proppant particle (grain or bead) size may be related to proppant performance. Particle size may be measured in mesh size ranges, e.g., defined as a size range in which 90% of the proppant fall within. In exemplary embodiments, the proppant is sand that has a mesh size of 20/40. Lower mesh size numbers, correspond to relatively coarser (larger) particle sizes. Coarser proppants may allow higher flow capacity based on higher mesh permeability. However, coarser particles may break down or crush more readily under stress, e.g., based on fewer particle-to-particle contact points able to distribute the load throughout the mesh. Accordingly, coated proppants are proposed to enhance the properties of the proppant particle.

Coating Process

To coat the proppant, in exemplary embodiments the undercoat layer (e.g., a polyurethane based layer) may be formed first. Thereafter, the top coat prepared using the preformed isocyanurate tri-isocyanate may be formed on (e.g., directly on) the undercoat. In a first stage of forming coated proppants, solid core proppant particles (e.g., which do not have a previously formed resin layer thereon) are heated to an elevated temperature. For example, the solid core proppant particles may be heated to a temperature from 50° C. to 180° C., e.g., to accelerate crosslinking reactions in the applied coating. The pre-heat temperature of the solid core proppant particles may be less than the coating temperature for the coatings formed thereafter. For example, the coating temperate may be from 40° C. to 170° C. In exemplary embodiments, the coating temperature is at least 85° C. and up to 170° C.

Next, the heated proppant particles are blended (e.g., contacted) with the components for forming the undercoat layer (i.e., first coating). For example, the proppant core particles may be blended with the isocyanate component and the isocyanate-reactive component in a mixer to form first coated proppants.

The mixer used for the coating process is not restricted. For example, as would be understood by a person of ordinary skill in the art, the mixer may be selected from mixers known in the specific field. For example, a pug mill mixer or an agitation mixer can be used. The mixer may be a drum mixer, a plate-type mixer, a tubular mixer, a trough mixer, or a conical mixer. Mixing may be carried out on a continuous or discontinuous basis. It is also possible to arrange several mixers in series or to coat the proppants in several runs in one mixer. In exemplary mixers it is possible to add components continuously to the heated proppants. For example, isocyanate component and the isocyanate-reactive component may be mixed with the proppant particles in a continuous mixer in one or more steps to make one or more layers of curable coatings.

Thereafter, the first coated proppants are blended with the components for forming the top coat layer (i.e., second coating). For example, when forming the top coat, the preformed isocyanurate tri-isocyanate may first be added to the mixer having the first coated proppants therein prior to introducing the one or more curatives. In exemplary embodiments, one or more catalyst and a carrier polyol may be added to the mixer prior to introducing the preformed isocyanurate tri-isocyanate. In exemplary embodiments, a process of forming both the undercoat and the top coat may take less than 10 minutes, after the stage of pre-heating the proppant particles and up until right after the stage of introducing the one or more curatives.

Any coating formed on the proppants (e.g., the first coating and/or the second coating) may be applied in more than one layer. For example, the coating process may be repeated as necessary (e.g. 1-5 times, 2-4 times, and/or 2-3 times) to obtain the desired coating thickness. The thicknesses of the respective coatings of the proppant may be adjusted. For example, the coated proppants may be used as having a relatively narrow range of proppant sizes or as a blended having proppants of other sizes and/or types. For example, the blend may include a mix of proppants having differing numbers of coating layers, so as to form a proppant blend having more than one range of size and/or type distribution.

The coated proppants may be treated with surface-active agents or auxiliaries, such as talcum powder or steatite (e.g., to enhance pourability). The coated proppants may be exposed to a post-coating cure separate from the addition of the curative. For example, the post-coating cure may include the coated proppants being baked or heated for a period of time sufficient to substantially react at least substantially all of the available reactive components used to form the coatings. Such a post-coating cure may occur even if additional contact time with a catalyst is used after a first coating layer or between layers. The post-coating cure step may be performed as a baking step at a temperature from 100° C. to 250° C. The post-coating cure may occur for a period of time from 10 minutes to 48 hours.

All parts and percentages are by weight unless otherwise indicated. All molecular weight information is based on number average molecular weight, unless indicated otherwise.

EXAMPLES

The materials principally used, and the corresponding approximate properties thereof, are as follows:

| | |
|---|---|
| Sand | Northern White Frac Sand, having a 20/40 mesh size. |
| Polyol A | A glycerine initiated propylene oxide based polyether triol, having a number average molecular weight of 250 g/mol (available from The Dow Chemical Company). |
| Polyol B | A glycerine initiated propylene oxide based polyether triol with ethylene oxide capping (EO content of less than 20 wt %), having a number average molecular weight of 4900 g/mol (available as VORANOL ™ 4701 from The Dow Chemical Company). |
| Isocyanate | Polymeric diphenylmethane diisocyanate (PMDI), having an NCO content of approximately 30.8 wt % (available from The Dow Chemical Company). |
| Catalyst 1 | A tertiary amine based catalyst that promotes the polyisocyanurate reaction, i.e., trimerization (available as Dabco ® TMR from Air Products ®). |
| Catalyst 2 | A dibutyltin dilaurate based catalyst that promotes the urethane or gelling reaction (available as Dabco ® T-12 from Air Products ®). |
| Coupling Agent | A coupling agent based on aminopropyltrimethoxysilane (available as Silquest ™ A-1100 from Momentive ™) |
| IPDI Trimer | A preformed cycloaliphatic isocyanate based trimer (an isocyanurate triisocyanate) derived from isophorone diisocyanate, supplied at 70% solids in butyl acetate, having an isocyanate content of 12.3 wt %, and having an isophorone diisocyanate monomer content of less than 0.5% (available as Tolonate ™ IDT 70 B from Vencorex Chemicals). |
| TETA | A curative that is described as including at least 97% of triethylenetetramine (for example, available from Sigma-Aldrich ®). |
| Surfactant | A surfactant based on cocamidopropyl hydroxysultaine (for example, available from Lubrizol) |

The approximate conditions (e.g., with respect to time and amounts) for forming Working Example 1 and Comparative Examples A and B are described below.

Preparation of Working Example 1

Working Example 1 includes a multilayer coating of 2 wt % of an undercoat that is a polyurethane based layer and 1 wt % of a top coat prepared using the IPDI trimer, based on the total weight of the coated sand. In particular, the undercoat is prepared using the Polyol A, the Isocyanate, and Catalysts 1 and 2, at an isocyanate index of 150 and a coating temperature of 160° C. The top coat is prepared using the IPDI trimer, TETA, and the Catalyst 2 provided with the Polyol B as a carrier, at an isocyanate index of 100 and a coating temperature of 160° C.

In particular, Working Example 1 is prepared using 750 grams of the Sand, which is first heated in an oven to 170°

C. to 180° C. Separately, in a beaker a First Pre-mix that includes 4.400 grams of the Polyol A, 0.150 grams of Catalyst 1, and 0.075 grams of Catalyst 2 is formed.

The heated Sand is introduced into a KitchenAid® mixer equipped with a heating jacket, to start a mixing process. During the above process, the heating jacket is maintained at 80% maximum voltage (maximum voltage is 120 volts, where the rated power is 425 W and rated voltage is 115V for the heating jacket) and the mixer is set to medium speed (speed setting of 5 on based on settings from 1 to 10). To form the undercoat layer on the Sand, the temperature of the Sand is checked periodically, and when the Sand has a temperature of 160° C., 0.6 mL of the Coupling Agent is added to the mixer. Then, 15 seconds from start of addition of the Coupling Agent, 4.6 grams of the First Pre-mix is added to the mixer over a period of 15 seconds. Next, 30 seconds after addition of the First Pre-mix, 10.6 grams of the Isocyanate is added over a period of 60 seconds to form a polyurethane based undercoat on the Sand.

Next, the top coat is formed on the coated Sand from above 30 seconds after addition of the Isocyanate is completed. Separately, in a beaker a Second Pre-mix that includes 1.000 gram of the Polyol B and 0.025 grams of the Catalyst 2 is formed. To form the top coat, firstly, the Second Pre-mix is added over a period of 15 seconds. Next, 15 seconds after the addition of the Second Pre-mix, 6.8 grams of IPDI trimer is added over a period of 60 seconds. Then, 30 seconds after addition of the IPDI trimer is completed, 0.7 grams of the TETA is introduced to the mixer over of period of 15 seconds and 1.0 mL of the Surfactant is added after 30 seconds. Then, 30 seconds later, the mixer is stopped (total of 5-6 minutes from start of addition of the Coupling Agent). Then, the dual layer coated Sand is emptied onto a tray and allowed to cool at room temperature (approximately 23° C.).

Preparation of Comparative Example A

Comparative Example A includes a single layer coating of 3 wt %, which single layer is the polyurethane based layer, similar to as discussed above with respect to Working Example 1, based on the total weight of the coated sand. Therefore, Comparative Example A excludes the top coat prepared using the IPDI trimer. Further, the polyurethane based layer is prepared using the Polyol A, the Isocyanate, and Catalysts 1 and 2, at an isocyanate index of 150 and a coating temperature of 160° C.

In particular, Comparative Example A is prepared using 750 grams of the Sand, which is first heated in an oven to 170° C. to 180° C. Separately, in a beaker a First Pre-mix that includes 6.600 grams of the Polyol A, 0.150 grams of Catalyst 1, and 0.075 grams of Catalyst 2 is formed.

The heated Sand is introduced into the KitchenAid® mixer equipped with the heating jacket, to start a mixing process. During the above process, the heating jacket is maintained at 80% maximum voltage (maximum voltage is 120V, where the rated power is 425 W and rated voltage is 115V for the heating jacket) and the mixer is set to medium speed. To form the polyurethane based layer on the Sand, the temperature of the Sand is checked periodically, and when the Sand has a temperature of 160° C., 0.6 mL of the Coupling Agent is added to the mixer. Then, 15 seconds from start of addition of the Coupling Agent, 6.7 grams of the First Pre-mix is added to the mixer over a period of 15 seconds. Next, 30 seconds after addition of the First Pre-mix, 15.9 grams of the Isocyanate is added over a period of 90 seconds to form a polyurethane based undercoat on the Sand. Next, 30 seconds thereafter, 1.0 mL of the Surfactant is added. Then, 30 seconds later, the mixer is stopped (total of 3 to 4 minutes from start of addition of the Coupling Agent). Then, the single coated Sand is emptied onto a tray and allowed to cool at room temperature (approximately 23° C.).

Preparation of Comparative Example B

Similar to Comparative Example A, Comparative Example B includes a single layer coating of the polyurethane based layer of 3 wt %, based on the total weight of the coated sand. Except for Comparative Example B, the coating of the single layer is carried out at the lower temperature of 90° C., instead of 160° C. Therefore, Comparative Example B excludes the top coat prepared using the IPDI trimer. Further, the polyurethane based layer is prepared using the Polyol, the Isocyanate, and Catalysts 1 and 2, at an isocyanate index of 190.

In particular, Comparative Example B is prepared using 750 grams of the Sand, which is first heated in an oven to 100° C. Separately, in a beaker a First Pre-mix that includes 5.625 grams of the Polyol A, 0.150 grams of Catalyst 1, and 0.075 grams of Catalyst 2 is formed.

The heated Sand is introduced into the KitchenAid® mixer equipped with the heating jacket, to start a mixing process. During the above process, the heating jacket is maintained at 60% maximum voltage (maximum voltage is 120V, where the rated power is 425 W and rated voltage is 115V for the heating jacket) and the mixer is set to medium speed. To form the polyurethane based layer on the Sand, the temperature of the Sand is checked periodically, and when the Sand has a temperature of 90° C., 0.6 mL of the Coupling Agent is added to the mixer. Then, 15 seconds from start of addition of the Coupling Agent, 5.7 grams of the First Pre-mix is added to the mixer over a period of 15 seconds. Next, 30 seconds after addition of the First Pre-mix, 16.9 grams of the Isocyanate is added over a period of 90 seconds to form a polyurethane based undercoat on the Sand. Next, 30 seconds thereafter, 1.0 mL of the Surfactant is added. Then, 30 seconds later, the mixer is stopped (total of 3 to 4 minutes from start of addition of the Coupling Agent). Then, the single coated Sand is emptied onto a tray and allowed to cool at room temperature (approximately 23° C.).

Evaluation of Properties

The following tests methods are used:

Dynamic mechanical thermal analysis (DMTA) is performed to study the viscoelastic behavior of the coating on the proppant sand, by applying a sinusoidal stress and measuring the strain in the material. In particular, the DMTA analysis is performed in dynamic or oscillation mode using an ARES rheometer from TA Instruments. The corresponding sand samples (coated sand samples for Working Example 1 and Comparative Examples A and B, and non-coated sand samples for the Control) are piled in a cup. Initial normal force of 15 N is applied (unless otherwise specified), and two cycles of strain sweep are performed at room temperature before starting the temperature ramp scan from room temperature to 250° C. Oscillation frequency is 1 Hz, strain amplitude is 0.02%, and heating scan is done at an increasing temperature of 3° C./min. The top plate diameter is 25 mm and the bottom cup inner diameter is 31 mm. The initial sand pack thickness was targeted around 3 mm each time.

The DMTA analysis illustrates storage modulus (G') relative to tan delta (bottom portion of graph), whereas a significant peak in the tan delta is determined as corresponding to a glass transition (T$_g$) of material. Overall, for the instance of coated proppants (especially for use in relatively high temperatures) the lack of a glass transition temperature over the measured range of temperatures is sought such that the material still demonstrates viscoelastic behavior over the full temperature range. The DMTA analysis further illustrates loss modulus (G") relative to tan delta (top portion of graph), overall a relatively stable loss modulus is sought. The DMTA analysis also illustrates a ratio of the loss modulus relative to the storage modulus (middle portion of graph). The storage modulus and the loss modulus are measured in pascals.

FIG. 1 illustrates a DMTA analysis chart for Working Example 1. As is shown in FIG. 1, the coated Sand with the undercoat and the top coat show relatively consistent loss modulus and storage modulus. It is noted that in a temperature range from about 25° C. to 250° C., a Tg is not observed for Working Example 1.

Figure 2:
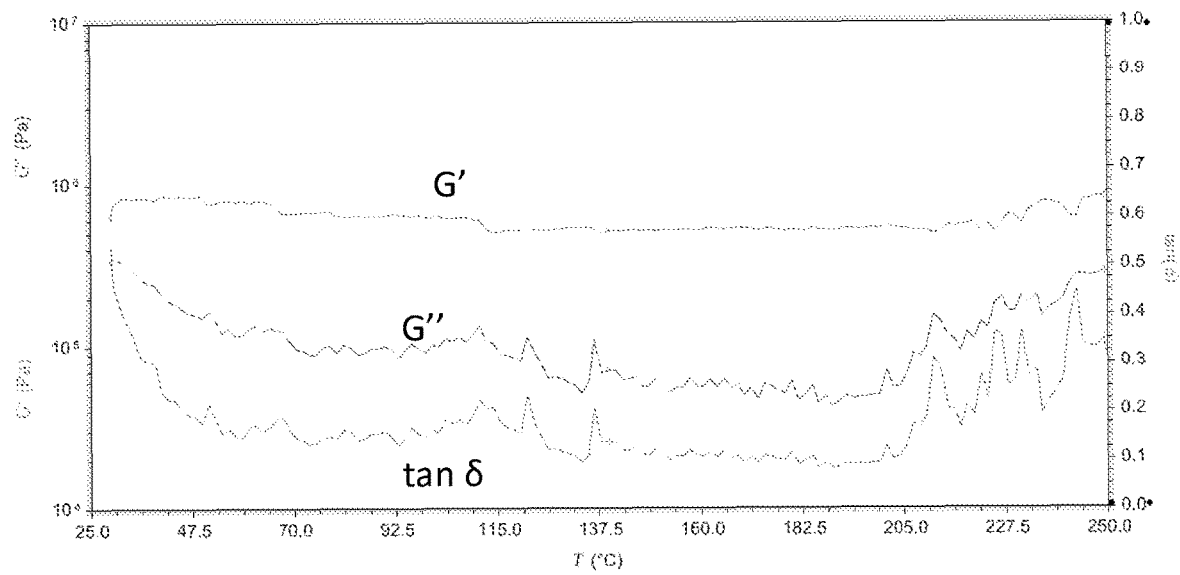
FIG. 2 illustrates a DMTA data graph for a control example of uncoated proppants (i.e., sand)

FIG. 2 illustrates a DMTA analysis chart for a Control sample, which includes the Sand in uncoated form (i.e., the Northern White Frac Sand discussed above, without having being treated to form layers thereon). While the storage modulus is relatively consistent, it is significantly lower than the storage modulus for Working Example 1. It is believed, the disturbance with respect to the storage modulus is based on sand molecules brushing against each other.

Figure 3:
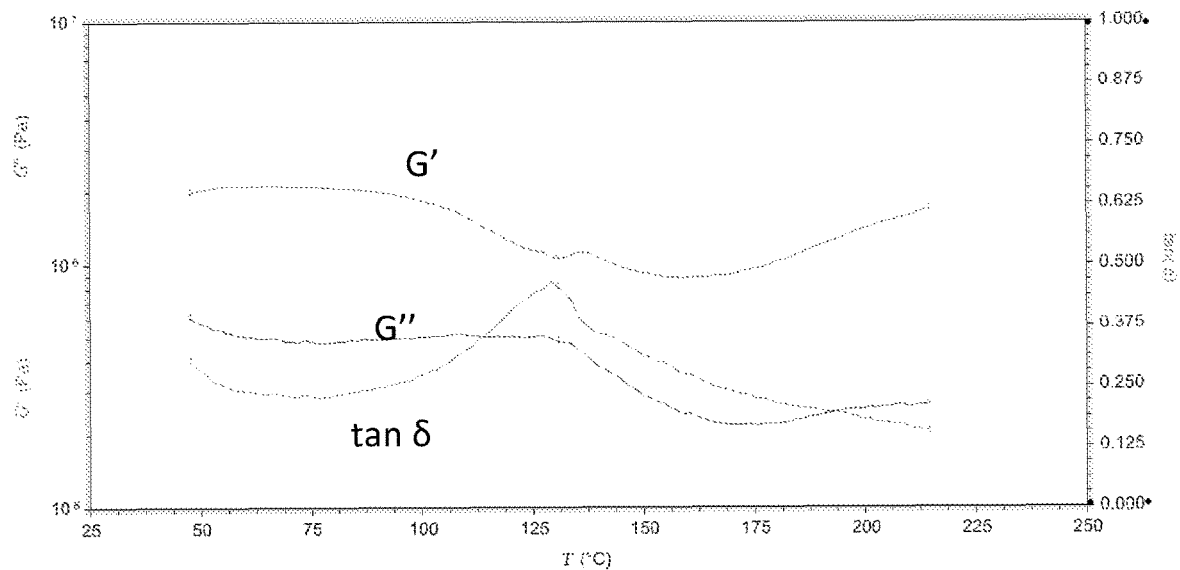
FIG. 3 illustrates a DMTA data graph for the coated proppants of Comparative Example A.
Figure 4:
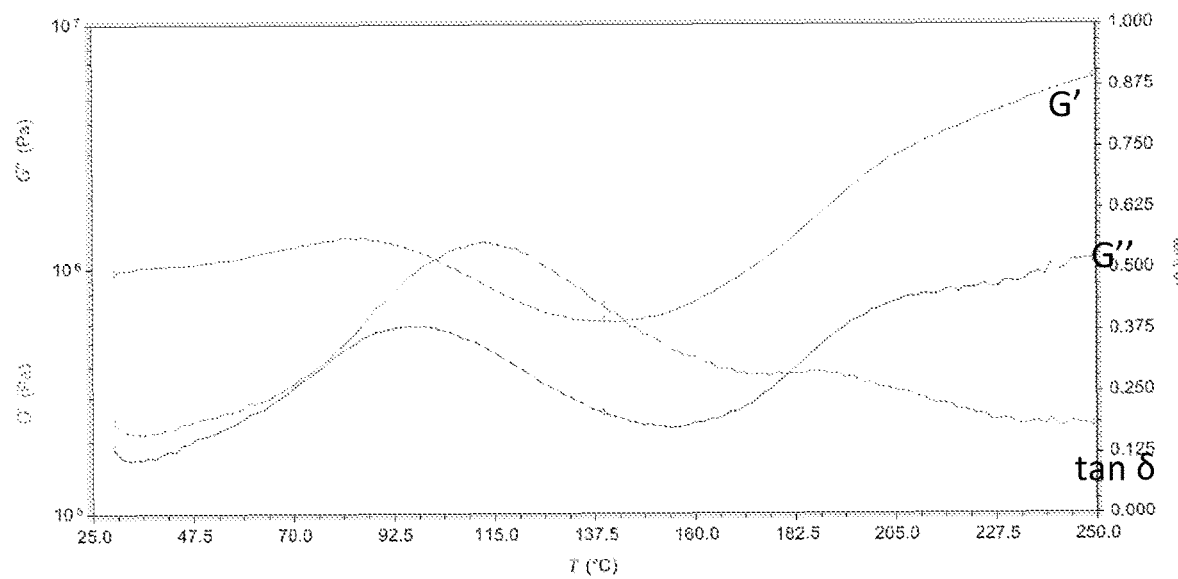
FIG. 4 illustrates a DMTA data graph for the coated proppants of Comparative Example B.

FIGS. 3 and 4 illustrate DMTA analysis charts for Comparative Examples A and B, respectively. For both Comparative Examples A and B, a pronounced sharp peak is seen with respect to tan delta, which peaks are interpreted as glass transition temperatures. In particular, for both Comparative Examples A and B a glass transition temperature less than about 140° C. is realized. As such, Comparative Examples A and B might not be preferred for use at higher temperatures, such as greater than 120° C.

Accordingly, Working Example 1 demonstrates improved results in comparison to the uncoated sand and the single layer polyurethane based coatings of Comparative Examples A and B.

Infrared (IR) Spectroscopy Data is performed to confirm the increased presence of isocyanate/isocyanurate triisocyanate in Working Example 1, relative to Comparative Example B. In particular, IR spectroscopy characterization is performed using a Nicolet™ FT-IR spectrometer equipped with a single bounce DuraScope™ diamond pike ATR and a pressure indicator where each sand grain is examined on one face at constant pressure. For the sand sample, 10-11 grains were examined and the spectra is averaged to obtain better signal-to-noise ratio. Spectral range was 4000-400 cm$^{-1}$, spectral resolution was 4 cm$^{-1}$ and 64 scans were co-added.

Figure 5:
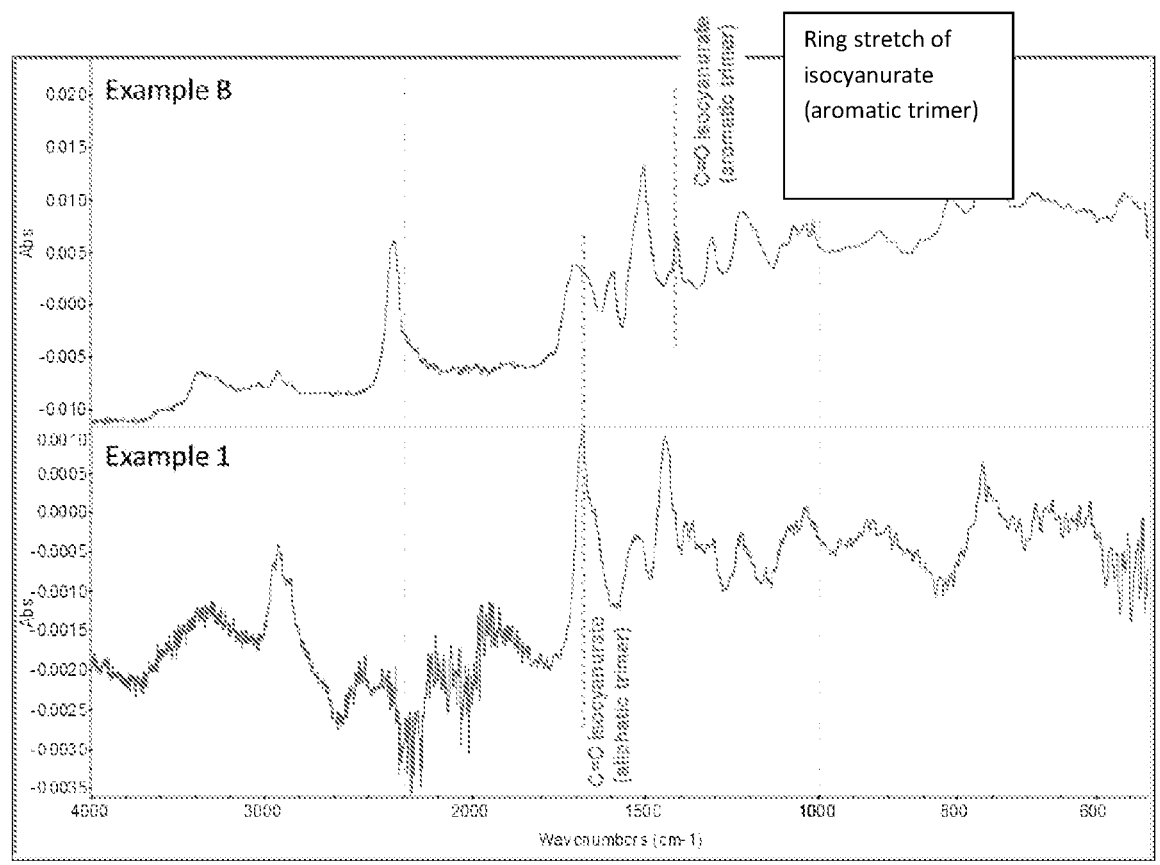
FIG. 5 illustrates an FT-Infrared spectral data graph for Working Example 1 and Comparative Example B, which confirms the increased presence of aliphatic trimers as compared to aromatic trimers for Working Example 1 and the presence of aromatic trimers from Comparative Example B.

FIG. 5 illustrates the IR spectroscopy analysis for Comparative Example B (top) relative to Working Example 1 (bottom). The increased presence of the aliphatic isocyanate based trimer is noted for Working Example 1, relative to the presence of the aromatic isocyanate based trimer in Comparative Example B. Thus, showing a substantial increase in the amount of trimers in the resultant coated proppants.

Scanning Electron Microscopy (SEM) imaging for the coatings on Working Example 1 is obtained using Cross section imaging. In particular, coated sand samples are prepared for top side SEM imaging using a vCD detector. A small amount of the sand is placed into a shallow dish and sputter coated with Pd (or Au/Pd). The sample is removed from the sputter coater, gently shaken to expose the uncoated side of the sand, and sputter coated again. This is performed for a total of two 20-second coatings ensuring that a thin coating is applied by the metal. Two aluminum SEM stubs are prepared for each sample with a smaller diameter double stick carbon tab. The sand is sprinkled on one of the stubs for mosaic imaging. With the other stub, rows of sand are placed onto the stub of randomly selected grains of sand using a pair of plastic tweezers to help protect against crushing the coating around the sand grains. The stubs are then coated with 15 seconds of iridium. Imaging of the top-sides of sand grains are done using a NOVA 600 scanning electron microscope (SEM) equipped with a VCD detector (vCD). Images were collected at 25 kV and approximately 5.9-7.5 mm working distance in Field Free mode.

Figure 6:
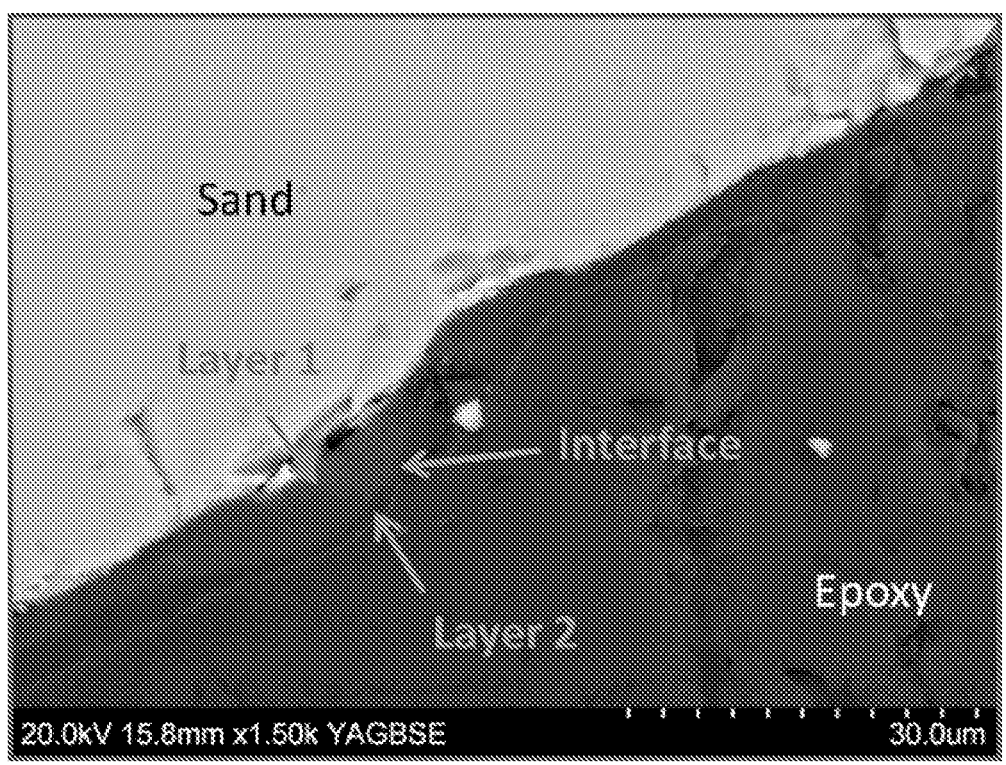
FIG. 6 illustrates a SEM image for the coating of Working Example 1.

FIG. 6 illustrates a cross section image on one sand sample of Working Example 1. Referring to FIG. 6, it is seen that two distinguishable coatings are formed on the Sand, which coatings include the undercoat and the top coat discussed herein.

The invention claimed is:

1. A coated proppant, comprising:
   a solid core proppant particle;
   a first resin coating; and
   a second coating on the first resin coating, the second coating including the reaction product of one or more curatives and one or more preformed aliphatic or cycloaliphatic based isocyanurate tri-isocyanates, derived from aliphatic diisocyanates, cycloaliphatic diisocyanates, or a combination of aliphatic and cycloaliphatic diisocyanates, the one or more preformed aliphatic or cycloaliphatic based isocyanurate tri-isocyanates being formed prior to formation of the second coating.

2. The coated proppant as claimed in claim 1, wherein the first resin coating includes a polyurethane based reaction product of an isocyanate component that includes one or more isocyanates and an isocyanate-reactive component that includes one or more polyols having a number average molecular weight from 150 g/mol to 6000 g/mol and that includes a catalyst component having one or more trimerization catalysts.

3. The coated proppant as claimed in claim 1, wherein the one or more preformed aliphatic or cycloaliphatic based isocyanurate tri-isocyanates is prepared prior to forming the second coating.

4. The coated proppant as claimed in claim 1, wherein the first resin coating includes polyurethane polymers and polyisocyanurate polymers derived from one or more aromatic polyisocyanates, such that the isocyanate component includes the one or more aromatic polyisocyanates.

5. The coated proppant as claimed in claim 1, wherein the first resin coating is directly between the solid core proppant particle and the second coating.

6. The coated proppant as claimed in claim 1, wherein the one or more curatives include one or more polyols, one or more polyamines, or a combination thereof.

7. The coated proppant as claimed in claim 1, wherein the mixture further includes one or more catalyst in a carrier polyol, the carrier polyol having a number average molecular weight of at least 1000 g/mol.

8. The coated proppant as claimed in claim 1, wherein an amount of the first resin coating is from 0.5 wt % to 2.5 wt % and an amount of the second coating is from 0.5 wt % to 2.5 wt %, based on the total weight of the coated proppant.

9. The coated proppant as claimed in claim 1, wherein the solid core proppant particle is a ceramic proppant or a silica sand proppant.

10. A method for the preparation of a coated proppant, the method comprising:

provinding a solid core proppant particle;

providing a first resin coating on the solid core proppant particle; and forming a second coating on the solid core proppant particle, by reacting one or more curatives and one or more preformed aliphatic or cycloaliphatic based isocyanurate tri isocyanates, derived from aliphatic diisocyanates, cycloaliphatic diisocyanates, or a combination of aliphatic and cycloaliphatic diisocyanates, the one or more preformed aliphatic or cycloaliphatic based isocyanurate tri-isocyanates being formed prior to formation of the second coating.

11. The method as claimed in claim 10, wherein the first resin coating is formed by reacting an isocyanate component that includes one or more isocyanates with an isocyanate reactive component that includes one or more polyols having a number average molecular weight from 150 g/mol to 6000 g/mol and that includes a catalyst component having one or more trimerization catalysts.

12. The method as claimed in claim 10, wherein the second coating is formed directly on the first resin coating.

13. The coated proppant as claimed in claim 1, wherein the one or more preformed aliphatic or cycloaliphatic based isocyanurate tri-isocyanates are derived from cycloaliphatic diisocyanates or a combination of aliphatic and cycloaliphatic diisocyanates.

* * * * *